May 28, 1963 G. SCHWARTZMAN 3,091,374
LIQUID METERING DEVICE
Filed July 28, 1960

INVENTOR.
GILBERT SCHWARTZMAN
BY Kenneth S. Goldfarb
ATTORNEY

United States Patent Office 3,091,374
Patented May 28, 1963

3,091,374
LIQUID METERING DEVICE
Gilbert Schwartzman, Scarsdale, N.Y., assignor to Glidomatic Corporation, Yonkers, N.Y.
Filed July 28, 1960, Ser. No. 45,851
1 Claim. (Cl. 222—448)

This invention relates to the class of metering and dispensing devices and in particular to a closure device for a liquid container adapted to permit dispensing a predetermined quantity of liquid from the container.

In the dispensing of medicines, it is very often desirable to provide a patient with a common measure such as a teaspoonful of a particular liquid. Often-times a teaspoon is not readily available while a tablespoon may be handy. It is almost impossible to measure the proper amount of liquid into a tablespoon and further, when filling a teaspoon fully, some of the liquid is apt to spill.

It is therefore the primary object of the present invention to provide a device for metering a specific amount of liquid in the form of a dose or portion of a medicine or other liquid, whereby the desired amount of liquid may be poured into any suitable container such as a tablespoon or the like for subsequent transferring.

In carrying out the invention, there is employed a novel spring-pressed valve assembly which includes a body capable of being positioned in the threaded neck portion of the conventional medicine bottle or other liquid container.

An additional object of the invention resides in the provision of means for sealing the container against liquid flow when the device is not in use.

Still further objects and features of this invention reside in the provision of a device for metering liquid that is simple in construction, capable of being manufactured out of readily available materials, which is inexpensive to manufacture and which is efficient in operation.

These, together with the various ancillary objects and features of the invention which will become apparent as the following description proceeds, are attained by this device for metering liquid, a preferred embodiment being illustrated in the accompanying drawing, by way of example only, wherein.

Figure 1:
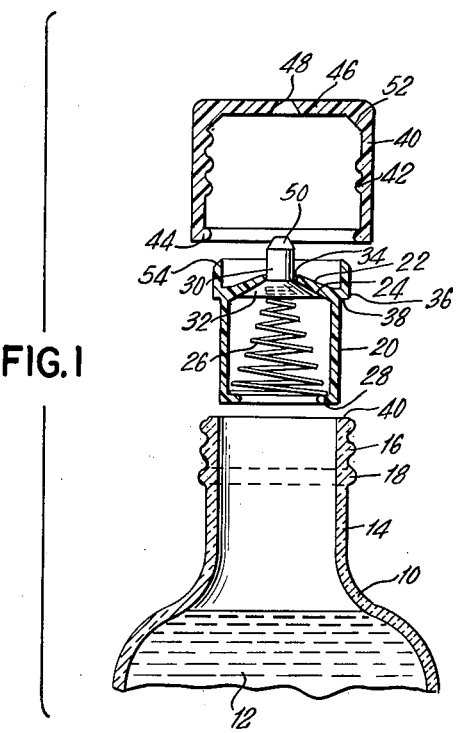
FIG. 1 is an exploded sectional detail view of the metering device comprising the present invention.

With continuing reference to the accompanying drawing, wherein like reference numerals are used to designate similar parts throughout the various views, reference numeral 10 generally designates a liquid container adapted to receive a medicine or other liquid 12 therein and having a neck portion 14 which is externally threaded as at 16 and which is provided with a neck ring 18.

Receivable within the neck portion 14 is a body 20 having an end wall 22 which is preferably tapered to form a tapered valve seat 24. Received in the body 20 is a conical coil spring 26 which bears against flange portion 28 preferably swaged from the body 20 and which is secured at its other end to a valve member 30.

The valve member 30 has a tapered portion 32 adapted to bear against the valve seat 24 with the valve member 30 extending through the opening 34 in the end wall 22.

A peripheral flange 36 is preferably integrally molded with the body 20 and is of greater diameter than body 20 so as to extend outwardly thereof, whereby the flange is provided with a shoulder 38 for seating on the edge 40 of the neck portion 14. Thus the flange 36 forms a stop for limiting the extent to which the body 20 may be inserted in the container 10.

The device includes a cap 40 which is internally threaded as at 42 and which is provided with a bead 44 in the end thereof for engagement with the ring 18 after the threaded portion 42 of the cap has become disengaged from the threaded portion 16 of the container.

The cap is provided with a top 46 having a tapered opening therein as at 48 into which the tapered end 50 of the valve member 30 is adapted to extend in sealing relation. The cap is provided with an internal beveled filet 52 adapted to cooperate with the beveled peripheral edge 54 of the flange 36 so as to form a seal. Further, the filet 52 retains the body 20 within the container 10 should it become loose or if it is merely inserted in the container 10 rather than press-fitted, though the body 20 preferably fits snugly or is press-fitted in the container 10.

Figure 2:
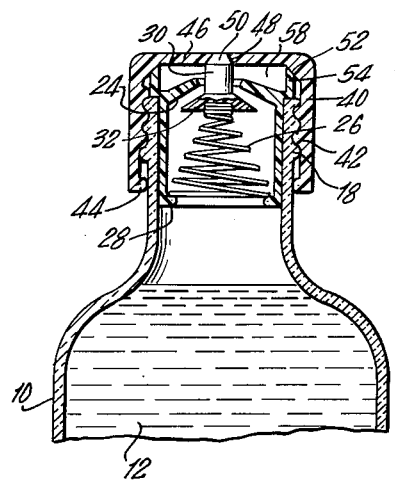
FIG. 2 is a sectional detail view showing the device in a closed position.
Figure 3:
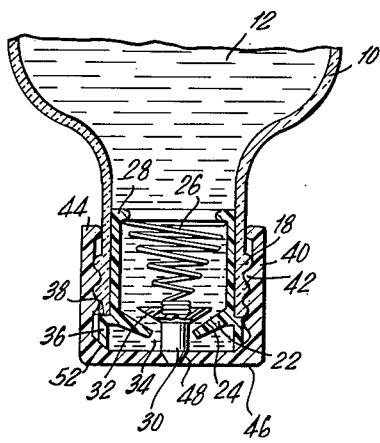
FIG. 3 is a view similar to FIG. 2 but showing the device in an overturned position after a quantity of liquid has been permitted to flow into the cap.
Figure 4:
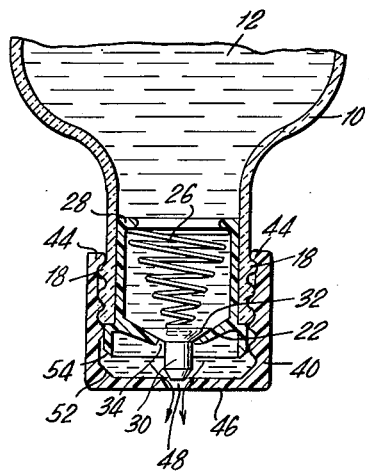
FIG. 4 is a sectional detail view of the device in an overturned position with the cap loosened to permit flow of liquid out of the cap in a measured amount.

In use, with the cap 40 threadedly secured as shown in FIG. 2, the container is ready for dispensing operation. The container is overturned and since the beveled portion 32 of the valve member 30 is spaced from the end wall 22, liquid will flow into the space 58 between the end wall 22 and the top 46 of the cap.

Upon unscrewing the cap until the bead 44 engages the ring 18, the valve member 30 will be withdrawn from aperture 48 permitting liquid flow from the space 58 while the spring 26 will prevent further liquid flow from the container 10 due to the fact that the spring now has pressed the beveled portion 32 into engagement with the valve seat 24. The amount of liquid flow in a single operation as heretofore described is of course predetermined and can be in the amount of a particular measure such as a teaspoonful or the like.

Various changes and modifications may be made without departing from the spirit and scope of the present invention and it is intended that such obvious changes and modifications be embraced by the annexed claim.

Having thus described the invention, what is claimed as new and desired to be secured by Letters Patent is:

A device for metering liquid comprising a container having a threaded neck portion, a body received in said neck portion and having an end wall provided with a valve opening therethrough, a valve member extending through and beyond said opening for closing said opening, spring means engaging said body and said valve member normally urging said valve member to close said opening, flange means secured to said body, an internally threaded cap threadedly engaging said threaded neck portion and being engageable with said flange to form a seal, said cap having an aperture therein, said valve member closing said aperture when said spring is under compression and being relatively movable away from said aperture when said cap is moved away from said body, said flange means including a peripheral flange having a beveled end, said cap having a beveled internal filet formed therein for engagement with said beveled end, said flange means extending outwardly of said body and forming a stop for said body, said neck portion having the end thereof engaged by said flange means, said end wall being conical, said valve member having an enlarged conical portion engageable with said conical end wall, said cap having means thereon for preventing complete removal of said cap from said container.

References Cited in the file of this patent
UNITED STATES PATENTS

| | | |
|---|---|---|
| 1,062,576 | Baskett | May 20, 1913 |
| 1,283,050 | Berg | Oct. 29, 1918 |
| 1,937,000 | Villanyi | Nov. 28, 1933 |
| 1,975,878 | Thomson | Oct. 9, 1934 |
| 2,579,167 | Atkinson | Dec. 18, 1951 |
| 2,828,893 | Stewart et al. | Apr. 1, 1958 |